United States Patent [19]

Nguyen et al.

[11] Patent Number: 5,335,326

[45] Date of Patent: Aug. 2, 1994

[54] MULTICHANNEL FIFO DEVICE CHANNEL SEQUENCER

[75] Inventors: Uoc H. Nguyen, Long Beach; Lipson Whang, Hacienda Heights; George Apostol, Los Angeles, all of Calif.

[73] Assignee: Xerox Corporation, Stamford, Conn.

[21] Appl. No.: 954,991

[22] Filed: Oct. 1, 1992

[51] Int. Cl.⁵ .................. G06F 13/00; G06F 13/38
[52] U.S. Cl. .................. 395/250; 395/425; 395/500; 395/575; 370/85.9; 364/238.8; 364/240.2; 364/241.9; 364/244.4; 364/254.5; 364/260.1; 364/DIG. 1
[58] Field of Search ............... 395/250, 275, 425, 325, 395/500, 575; 370/60, 85.1, 85.7, 85.9, 85.13, 95.1

[56] References Cited

U.S. PATENT DOCUMENTS

| | | | |
|---|---|---|---|
| 4,625,307 | 11/1986 | Tulpule et al. | 370/85 |
| 4,935,894 | 6/1990 | Ternes et al. | 395/325 |
| 5,003,463 | 3/1991 | Coyle et al. | 395/275 |
| 5,043,981 | 8/1991 | Firoozmand et al. | 370/85.1 |
| 5,050,066 | 9/1991 | Myers et al. | 395/575 |
| 5,056,010 | 10/1991 | Huang | 395/425 |
| 5,133,062 | 7/1992 | Joshi et al. | 395/500 |
| 5,191,581 | 3/1993 | Woodbury et al. | 370/85.9 |
| 5,265,211 | 11/1993 | Amini et al. | 395/325 |
| 5,276,838 | 1/1994 | Rao et al. | 395/425 |
| 5,280,584 | 1/1994 | Caesar et al. | 395/250 |

Primary Examiner—Alyssa H. Bowler
Assistant Examiner—Alpesh M. Shah

[57] ABSTRACT

The present invention is bus to bus interface for connecting a first bus to a second bus. A control means includes first and second control sequence means, substantially similar, for tracking and controlling the channels of data within a first and a second FIFO device. The first sequence control means includes first circular queue means for providing a predetermined number of slots, with each slot containing information regarding a channel of data already resident in first FIFO device, including the identity of the channel and the status of the channel, and containing information regarding a channel of data pending residence in first FIFO device, including the identity of the pending channel. The first sequence control means further includes first input pointer means for traversing first circular queue means, slot by slot, and if a slot contains the identity of a resident channel, then updating the status information in the slot of that resident channel, and if the slot does not contain the identity of a resident channel, then determining whether any channels are pending residence in first FIFO device, and if so inserting in the slot the identity of a pending channel and commencing transfer of the pending channel into first FIFO device, provided first FIFO device has room for the pending channel.

1 Claim, 10 Drawing Sheets

MULTICHANNEL FIFO DEVICE CHANNEL SEQUENCER

BACKGROUND OF THE INVENTION

This invention relates to asynchronous bus to bus interfaces, and more particularly to a method for sequencing the channels of a multichannel FIFO device used to convey data from one bus to another bus.

There are a number of approaches to implementing asynchronous bus to bus interfaces. For example, U.S. Pat. No. 4,935,894, issued Jun. 19, 1990 to Ternes et al., describes a bus to bus interface that connects two asynchronous buses. The bus to bus interface includes two separate bus interfaces, a first bus interface that couples a first bus to a processor on a second bus, and a second bus interface that couples the second bus to a processor on the first bus. Each bus interface includes a first in first out (FIFO) register, interrupt logic, and transmitter/receiver logic. Communication through the bus interfaces is governed by a particular protocol that includes a 16-bit wide control word. The control word can contain data, as well as the address of a destination device.

U.S. Pat. No. 5,050,066, issued Sep. 17, 1991 to Myers et al., discloses an apparatus for queuing requests and replies on a pipelined packet bus. The apparatus connects one or more system buses to one or more local buses. The apparatus includes a RAM buffer for storing packet information corresponding to each request to be sent over a system bus in bus time slots allotted to each request, three send slots and three receive slots for keeping track of the states of respective three send and three receive requests that are stored in the RAM, nine send queue counters for stepping through a series of states to track an outgoing request and to track a corresponding incoming reply, and six receive queue counters for stepping through a series of states to track an incoming request and to track a corresponding reply. Status information as to the state of the slots is generated by an output MUX connected to the send and receive queues, the status information being used to control the incrementing or decrementing of the send and receive queue counters in accordance with a predetermined system bus protocol.

U.S. Pat. No. 5,003,463, issued Mar. 26, 1991 to Coyle et al. discloses a bus interface that couples a system bus to an I/O bus. The bus interface includes read and write buffer storage for buffering data transferred between the system bus and the I/O bus. The I/O bus includes signal lines that indicate when the read and the write buffers are full, and processors on the I/O bus are capable of differentiating between read and write buffer full conditions.

While these devices have generally performed adequately, they lack the flexibility to be more efficient.

SUMMARY OF THE INVENTION

The present invention is bus to bus interface for connecting a first bus to a second bus. The bus to bus interface includes a first bus interface means that connects to the first bus for conveying data and control information to and from the first bus, a second bus interface means that connects to the second bus for conveying data and control information to and from the second bus, and a central buffer means that connects to the first bus interface means and the second bus interface means. The central buffer means includes a first FIFO device that connects to the first bus interface means and to the second bus interface means for conveying data, organized within first FIFO device as one or more serial, identified, channels, from first bus interface means to second bus interface means. The central buffer means also includes a second FIFO device that connects to first bus interface means and second bus interface means for conveying data, organized within second FIFO device as one or more serial, identified, channels, from second bus interface means to first bus interface means. The central buffer means further includes a control means that connects to the first bus, first bus interface means, second bus, second bus interface means, and the central buffer means, for receiving and transmitting control information from and to the first bus, first bus interface means, second bus, second bus interface means, and the central buffer means, and for controlling the operation of first bus interface means, second bus interface means, and the central buffer means, including operation of the first and second FIFO devices, in response to the received control information.

The central buffer means is for conveying data between first bus interface means and second bus interface means, and for conveying control information between control means and first bus interface means and second bus interface means. The control means includes first control sequence means for tracking and controlling the channels of data within first FIFO device. The first sequence control means includes first circular queue means for providing a predetermined number of slots, with the slots arranged circularly in series, with each slot capable of containing information regarding a channel of data already resident in first FIFO device, including the identity of the channel and the status of the channel, and capable of containing information regarding a channel of data pending residence in first FIFO device, including the identity of the pending channel. The first sequence control means further includes first input pointer means for traversing first circular queue means, slot by slot, and if a slot contains the identity of a resident channel, then updating the status information in the slot of that resident channel, and if the slot does not contain the identity of a resident channel, then determining whether any channels are pending residence in first FIFO device, and if so inserting in the slot the identity of a pending channel and commencing transfer of the pending channel into first FIFO device, provided first FIFO device has room for the pending channel. The first input pointer means is prevented from advancing to the same slot as the first output pointer means, and the first output pointer means is prevented from advancing to the same slot as the first input pointer means so that resident channels of data in first FIFO device are not overwritten before the resident channels of data are outputted from the first FIFO device.

The control means further includes a second control sequence means for tracking and controlling the channels of data within second FIFO device. The second sequence control means includes second circular queue means for providing a predetermined number of slots, with the slots arranged circularly in series, with each slot capable of containing information regarding a channel of data already resident in second FIFO device, including the identity of the channel and the status of the channel, and capable of containing information regarding a channel of data pending residence in second FIFO device, including the identity of the pending channel. The second sequence control means further includes second input pointer means for traversing second circular queue means, slot by slot, and if a slot contains the identity of a resident channel, then updating the status information in the slot of that resident channel, and if the slot does not contain the identity of a resident channel, then determining whether any channels are pending residence in second FIFO device, and if so inserting in the slot the identity of a pending channel and commencing transfer of the pending channel into second FIFO device, provided second FIFO device has room for the pending channel. The second input pointer means is prevented from advancing to the same slot as the second output pointer means, and the second output pointer means is prevented from advancing to the same slot as the second input pointer means so that resident channels of data in second FIFO device are not overwritten before the resident channels of data are outputted from the second FIFO device.

DESCRIPTION OF THE PREFERRED EMBODIMENTS

OVERVIEW

Figure 1:
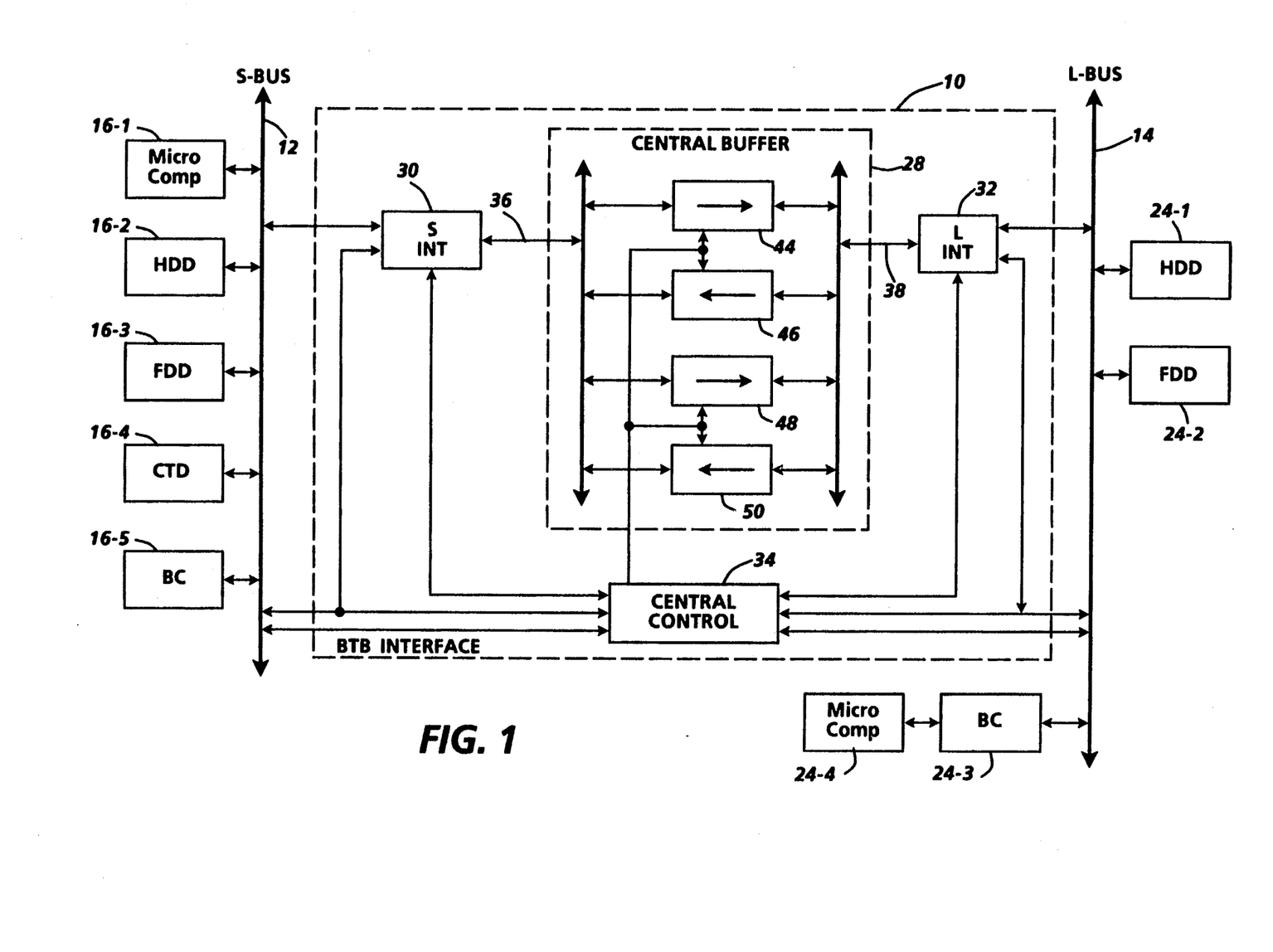
FIG. 1 is a system block diagram of a bus to bus interface embodying the method of the present invention, the interface including a central control, an S-bus interface, and L-bus interface, and a central buffer that uses multichannel and single channel FIFO devices.

In FIG. 1 there is shown a bus to bus (BTB) interface 10 that connects two asynchronous buses, bus 12 and bus 14. BTB interface 10 conveys data between devices 16 connected to bus 12, and devices 24 connected to L-bus 14. BTB interface 10 also allows intrabus data conveyance between devices 16 and 24 on bus 12 and bus 14, respectively. Typical devices 16 connected to bus 12 include microcomputer 16-1, hard disk drive 16-2, floppy disk drive 16-3, cartridge tape drive 16-4, and bus controller 16-5 for controlling bus 12. Typical devices 24 connected to bus 14 include hard disk drive 24-1, floppy disk drive 24-2, and bus controller 24-3 for controlling bus 14. Microcomputer 24-4 also connects to bus 14 via bus controller 24-3. There is a unique bus address 17 for each device 16 on bus 12, and for each device 24 on bus 14.

Preferably bus 12 is an S-bus, a standard bus of Sun Corporation. S-bus 12 is described in further detail in an industry standard, IEEE1496, incorporated herein by reference. Preferably bus 14 is an L-bus, a standard of Xerox corporation.

In brief, BTB interface 10 includes central buffer 28, S-bus interface 30, L-bus interface 32, and central control 34. Central control 34 connects to S-bus 12, L-bus 14, central buffer 28, S-bus interface 30 and L-bus interface 32, and controls the overall operation of BTB interface 10. Central buffer 28 connects to S-bus 12 and to L-bus 14 through respective bus interfaces 30 and 32. Central buffer 28 stores data under the control of central control 34, for later transfer to devices 16 or 24 on buses 12 or 14. S-bus interface 30 provides synchronized transfer of data to and from S-bus 12, and also converts data between the format or protocol used for data by S-bus 12, and the format used by central buffer 28. Similarly, L-bus interface 32 synchronizes transfer of data to and from L-bus 14, and performs any needed data format conversion.

To store data, central buffer 28 contains four First In, First Out (FIFO) devices 44, 46, 48 and 50 each of which is connected between S and L bus interfaces 30 and 32, and is connected to and controlled by central control 34. To accommodate the asynchronous nature of buses 12 and 14, FIFO devices 44 and 48 are dedicated to receiving data from S bus 12 (through S-bus interface 30), while FIFO devices 46 and 50 are dedicated to receiving data from L bus 14 (through L-bus interface 32).

Figure 2:
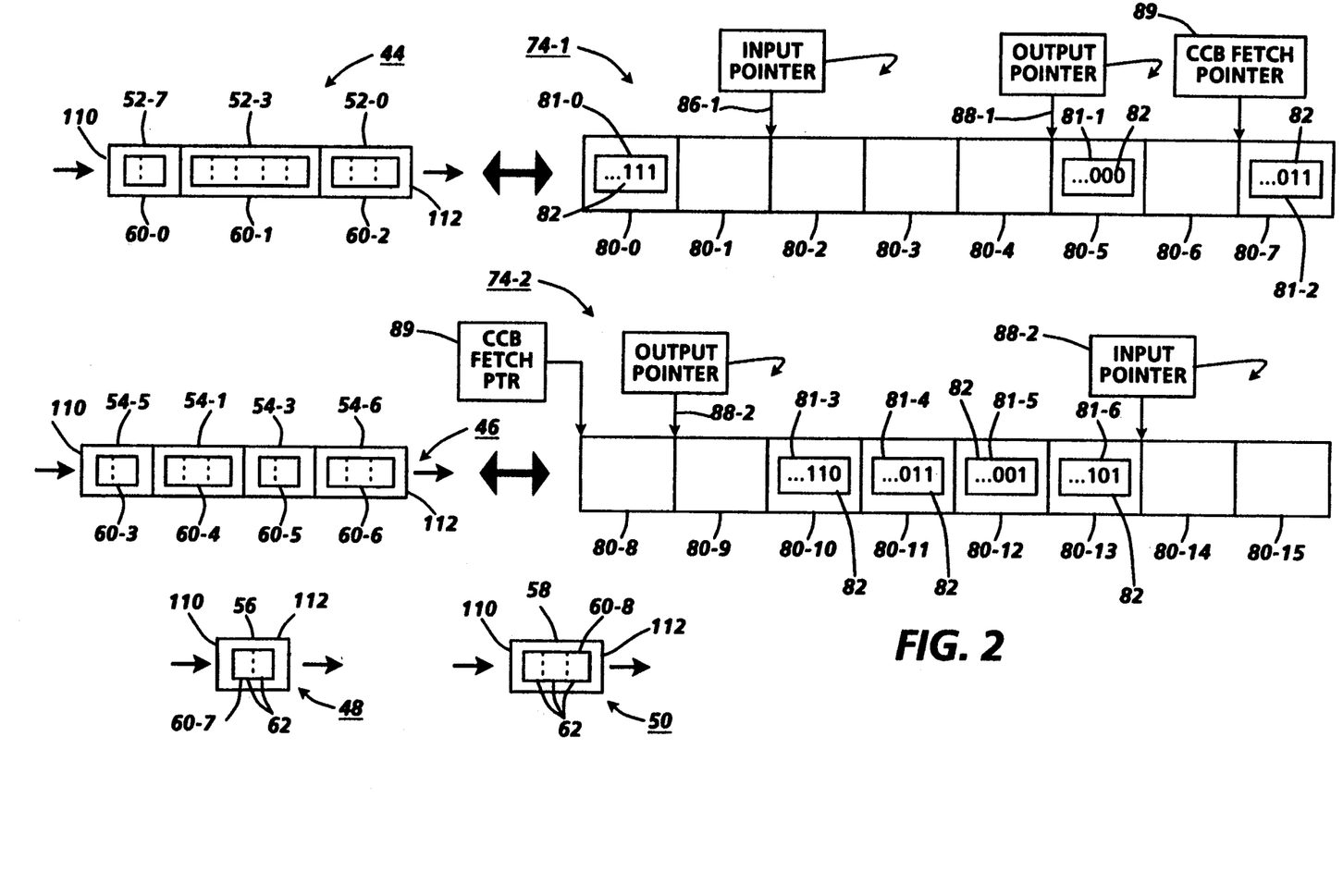
FIG. 2 is a diagram of the channels of the FIFO devices of FIG. 1, and the structure of the CS registers used by the central control of FIG. 1 to track and control the channels.
Figure 4:
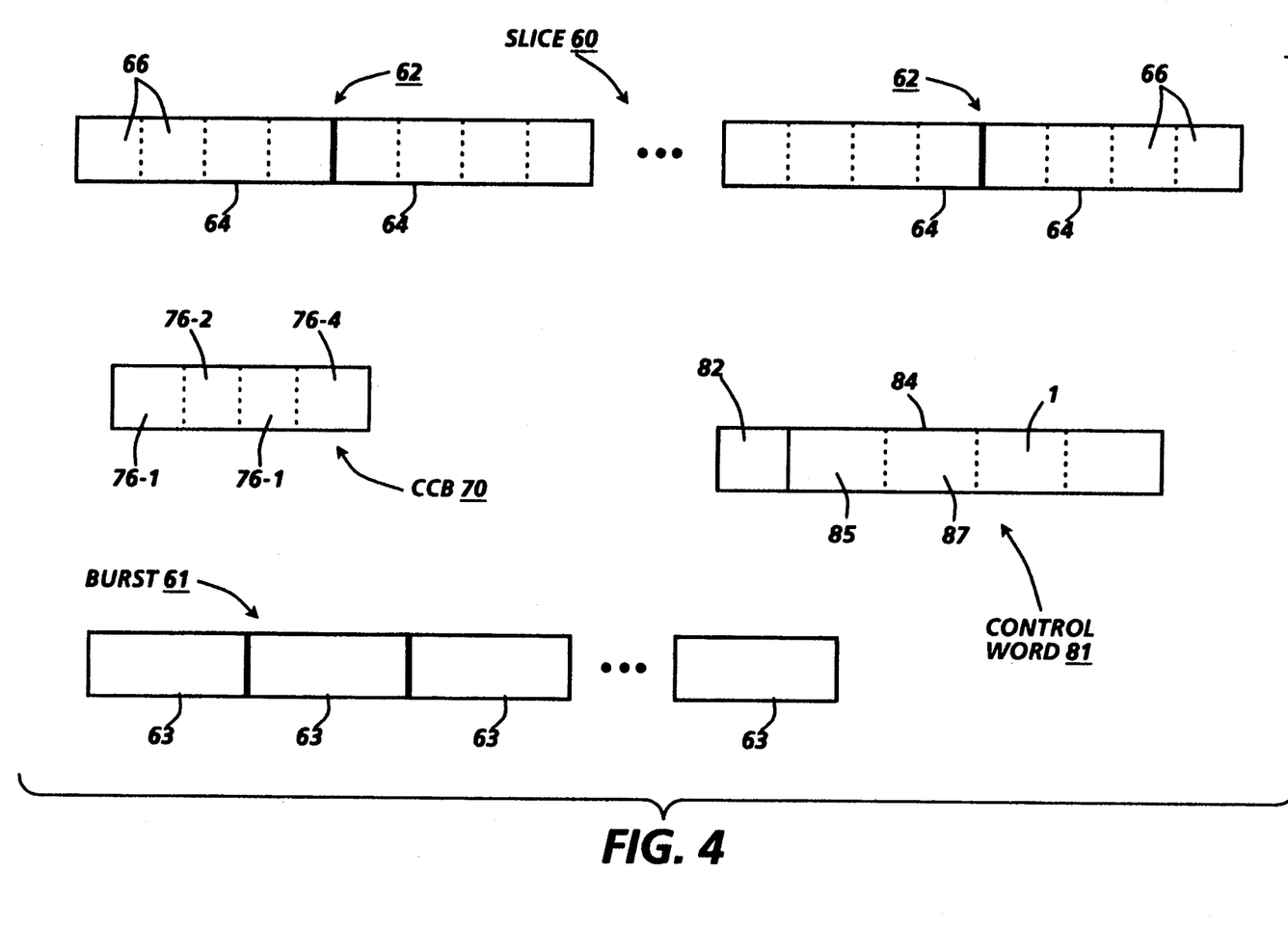
FIG. 4 is a diagram of the structures of various data and control words used in the interface of FIG. 1.

Referring now to FIG. 1, 2, and 4, central control 34 organizes and tracks most of the data conveyed by BTB interface 10 using multiple, uniquely identified, channels 52 that can reside in FIFO device 44 and using multiple, uniquely identified, channels 54 that can reside in FIFO device 46. Before data can be transferred through multichannel device 44 or multichannel device 46, there must be specified a particular respective channel 52 and 54 that will contain the data. Channels 52 move serially through multichannel device 44 and channels 54 move serially through multichannel device 46, tracked and controlled by central control 34 on a first in, first out basis. Channels 52 and 54 are a vehicle by which respective devices 44 and 46 can buffer data from different source addresses 17, and intended for different destination addresses 17. Since devices 44 and 46 are intended primarily for transferring data between memory locations on different buses 12 and 14, devices 44 and 46 are also known as DMA (Direct Memory Access) devices 44 and 46.

In contrast, within FIFO device 48 there resides only a single channel 56. Similarly, within FIFO device 50 there resides only a single channel 58. In each channel 56 and 58 there is data from only one source address 17, intended for only one destination address 17. Since devices 48 and 50 are intended primarily for transferring commands between buses 12 and 14, and from buses 12 and 14 to interface 10, devices 48 and 50 are also known as PIO (Programmed Input/Output) devices 48 and 50.

Preferably there is a predetermined maximum number of possible channels 52 that can reside in device 44 and a predetermined maximum number of possible channels 54 that can reside in device 46. Preferably DMA device 44 has at most eight respective channels 52, and DMA device 46 also has at most eight respective channels 54, and together devices 46 and 48 contain a combined total of eight channels 52 and 54. At any given moment a particular channel 52 and 54 need not be present in a particular respective DMA device 44 and 46. For example, in FIG. 2 DMA device 44 is shown to have only three resident channels 52 present out of the possible eight channels 52, namely channels 52-0, 52-3 and 52-7.

Referring now to FIGS. 1, 2, and 4, within devices 44, 46, 48 and 50 data is stored in respective channels 52, 54, 56 and 58 in blocks called slices 60. A slice 60 of data is a collection of data sent to BTB Interface 10 from the same source address 17, and intended for the same destination address 17. Although collected within BTB interface 10 as a slice 60, typically devices 16 and 24 send data to BTB interface 10 in one or more bursts 61, each burst 61 consisting of one or more words 63. On S-bus 12, each burst 61 can vary in size from between one and sixteen words 63, and each word 63 is typically four bytes wide, but can be from between one and eight bytes wide depending on the port size of the device 16. Preferably, however, each burst 61 is fixed at eight words 63. On L-bus 14 each burst 61 is typically fixed at eight words 63, and each word 63 is typically four bytes wide.

Slices 60 are organized and stored as double words 62 that consists of two words 64 of four bytes 66 per word 64. Each slice 60 can vary in size from a minimum size of a single double word 62, to a predetermined maximum size of a number of double words 62. For example, in FIG. 2 the slices 60 in channels 52-0, 52-3 and 52-7 have three, five and two double words 62, respectively. Channels 56 and 58 of respective PIO devices 48 and 50 have slices 60 with two and three double words 62, respectively.

PIO devices 48 and 50 are limited to containing a single slice 60 at a time, a limitation that simplifies command and control of devices 48 and 50. Before a slice 60 can be written into a PIO device 48 and 50, any slice 60 already resident must be read out. This limitation does not reduce the effectiveness of PIO devices 48 and 50: The intended tasks of PIO devices 48 and 50 are to program central control 34, and to bypass DMA devices 44 and 46 with urgent commands, and in case of deadlock. In contrast, the primary paths for conveying data through BTB interface 10 are intended to be DMA devices 44 and 46. DMA devices 44 and 46 are aided in this task by supporting multiple slices 60 in channels 52 and 54, as discussed further herein.

TWIN CHANNEL SEQUENCE REGISTERS

Figure 3A:
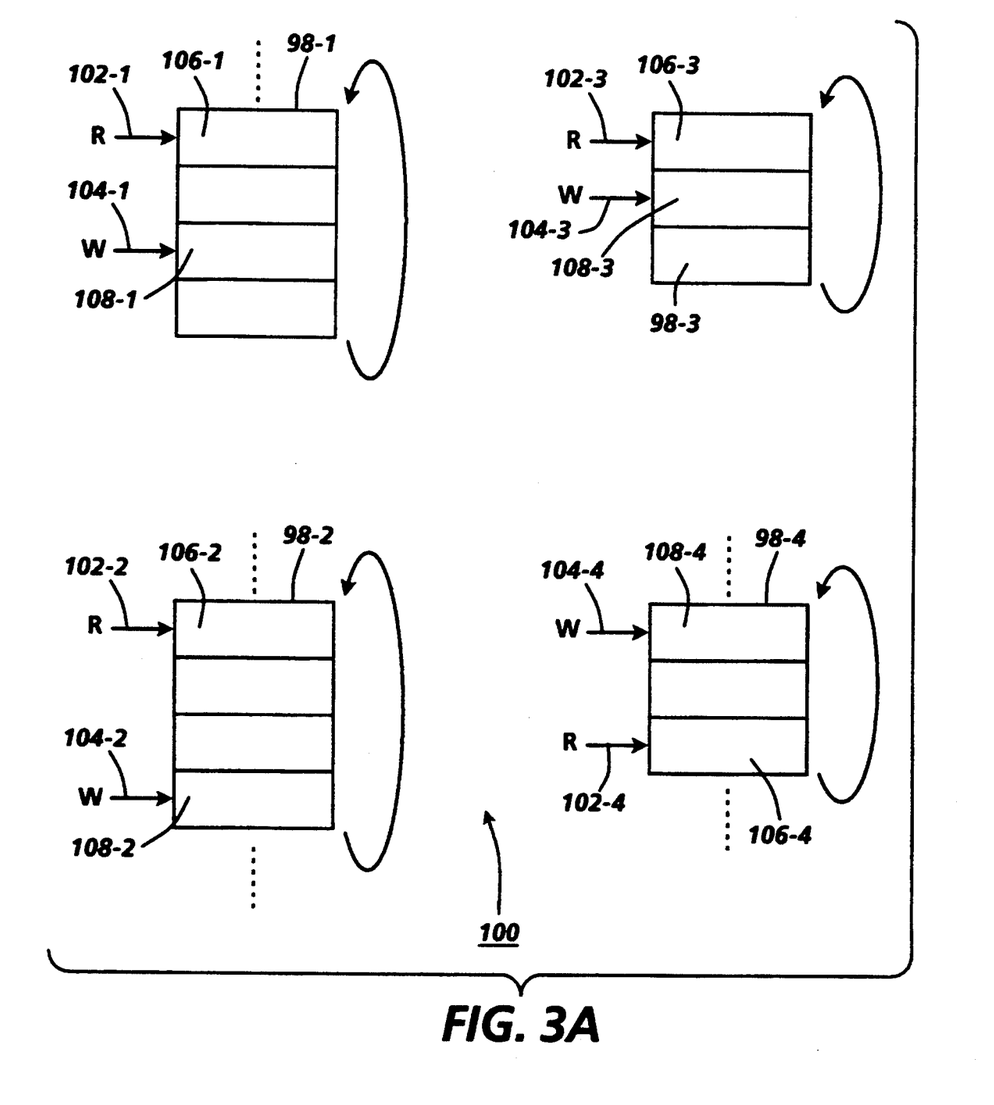
FIG. 3A is a showing FIFO devices of central buffer of the interface of FIG. 1 implemented in RAM.
Figure 3B:
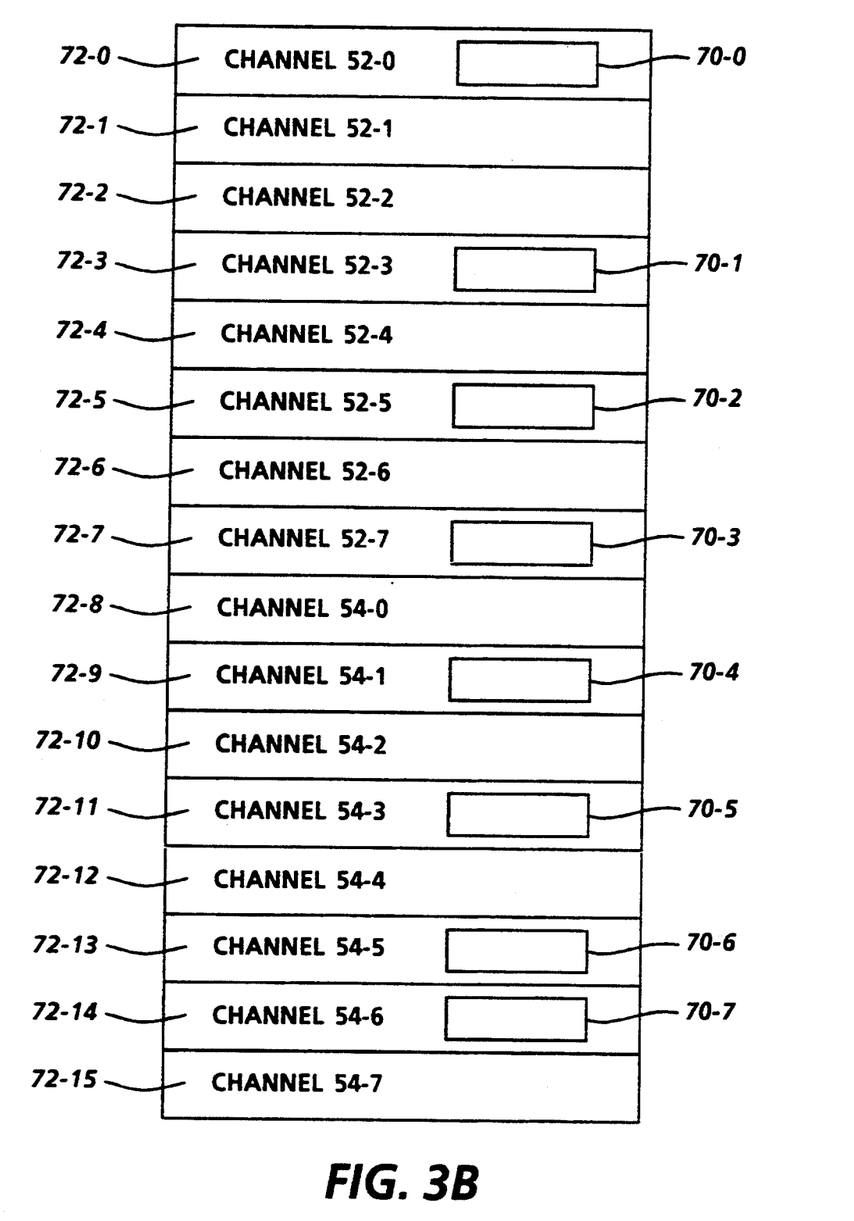
FIG. 3B is a diagram showing the relationship between CCB registers and channels of FIFO devices of FIG. 1, and showing the CCBs resident in particular CCB registers.

Referring now to FIGS. 1, 2, and 3, for DMA device 44, central control 34 must keep track of what channels 52 are pending to reside in device 44 and what slice 60 is associated with each pending channel 52. Central control 34 must also keep track of what channels 52 presently reside in device 44, and in what order so that the first channel 52 in to device 44 is the first channel 52 out of device 44, and what slice 60 is contained in each channel 52 resident in device 44. Central control 34 must also perform the above functions for DMA device 46.

In accordance with the invention, central control 34 tracks and controls pending and resident channels 52 and 54, and their associated slices 60, using Channel Control Blocks (CCBs) 70, Channel Control Block Registers (CCB Registers) 72, and Channel Sequence Registers (CS Registers) 74. In brief, there are two CS registers 74. CS register 74-1 is associated with DMA device 44, and CS register 74-2 is associated with DMA device 46. Each CS register 74 is a circular queue of slots 80 that can contain control words 81 representing channels 52 and 54 that are resident in respective devices 44 and 46. Each CS register 74 includes an input pointer 86 that points to the next slot 80 involved in an input operation, an output pointer 88 that points to the next slot 80 involved in an output operation, and a CCB fetch pointer 89 used in conjunction with CCB chaining, as discussed further herein. To drive pointers 86, 88 and 89, central control 34 uses state machines (not shown). The input pointer 86 and output pointer 88 link each CS register 74 to its associated DMA device 44 and 46: The position of the control words 81 in slots 80 between respective output and input pointers 86 and 88 tracks the positions within the DMA devices 44 and 46 of the respective resident channels 52 and 54 associated with the control words 81. Control words 81 contain status information about resident channels 52 and 54, but control words 81 do not contain the information needed to transfer slices 60 to and from BTB interface 10.

Preferably, control words 81 also point to or identify a CCB register 72. Alternatively, each slot 80 is dedicated to a particular channel 52 and 54, and also dedicated to a particular CCB register 72. In this manner, there is no need for a control word 81 to point to a particular CCB register 72.

There is one unique CCB register 72 for each possible channel 52 and 54. A CCB register 72 can contain a CCB 70 that in turn describes a single slice 60 of data. In the case of a pending channel 52 and 54, a CCB 70 in the appropriate CCB register 72 describes a slice 60 that is ready to be transferred to BTB interface 10, but has not yet been transferred. For a resident channel 52 and 54, a CCB 70 in the appropriate CCB register 72 describes a slice 60 that has been transferred to the channel 52 and 54 residing in particular DMA device 44 and 46. This arrangement of CCBs 70, CCB registers 72, and CS registers 74 and associated pointers 86 and 88 provides an effective means of tracking and controlling pending and resident channels 52 and 54 for respective DMA devices 44 and 46.

Preferably CCBs 70 for devices 16 and 24 are created by the respective microcomputers 16-1 and 24-4 resident on respective buses 12 and 14. Preferably microcomputers 16-1 and 24-4 also command central control 34 to place the CCBs 70 in CCB registers 72, thereby assigning channels 52 and 54 to slices 60 awaiting transfer from devices 16 and 24 to BTB interface 10. (CCBs 70 are actually transferred to CCB registers 72 via control and data lines.) This approach simplifies the task of assigning channels 52 and 54, since on each bus 12 and 14 a central authority, respective microcomputers 16-1 and 24-4, supervise the assignment of channels 52 and 54. Moreover, this approach simplifies the actual sending of data to BTB Interface 10, since having prepared the CCBs 70 and assigned channels 52 and 54, respective computers 16-1 and 24-4 know when and where the data associated with the CCBs 70 will be available for transfer to interface 10.

A CCB 70 includes various fields 76 that describe the associate slice 60. Length field 76-1 describes the length of its associated slice 60 (i.e., number of bytes 66 of data). Source address field 76-2 describes the source address 17 of the source device 16 and 24. Destination address field 76-3 describes the destination address 17 of the destination device 16 and 24.

Chaining field 76-4 of CCB 70 describes whether a subsequent CCB 70 is chained to the present CCB 70. Chaining of CCBs 70 is a useful capability that allows more than one slice 60 to be transferred to BTB interface 10 under the authority of a single channel 52 and 54, with each slice 60 described by an associated CCB 70. Since only one CCB 70 at a time can be stored in each CCB register 72, chaining of CCBs 70 requires subsequent CCBs 70 to be stored somewhere other than CCB register 72. Typically subsequent CCBs 70 are stored in a memory location (not shown) addressable on the associated bus 12 and 14. At the appropriate time, central control 34 will cause the subsequent CCB 70 to replace the present CCB 70 in the particular CCB register 72.

Each CS register 74 is a circular queue that includes of a number of slots 80 that each can either be active or inactive. An active slot 80 contains a control word 81, while an inactive slot 80 awaits insertion of a control word 81 by central control 34. Among other things, preferably a control word 81 includes an identifier or number 82 of a resident channel 52 and 54, that acts as a pointer to the CCB register 72 holding the CCB 70 associated with the slice 60 in the respective channels 52 and 54. Alternatively a control word 81 does not include a channel number 82. Instead each slot 80 is dedicated to a particular channel 52 and 54.

Each CS register 74 includes an input pointer 86, an output pointer 88, and a CCB fetch pointer 89. Pointers 86, 88, and 89 circle the CS register 74, operating on the control words 81 in slots 80. In addition to a channel number 82, a control word 81 includes a transfer in progress flag 84, a slice input flag 85, a CCB fetch flag 1, and a slice output flag 87 that are used by the state machines that control the pointers 86, 88 and 89 to communicate between themselves and with the rest of control control 34. Input pointer 86 signals the rest of central control 34 to transfer the appropriate slice 60 of data into a channel 52 and 54 of respective DMA device 44 and 46, then sets the transfer in progress flag 85 to indicate a transfer is in progress, even though the associated slice 60 may not yet be either partially or completely in the associated channel 52 and 54 in the associated DMA device 46 and 48 (e.g., the input transfer may not yet have begun, due to arbitration for buses, or the input transfer may require multiple bursts 61 to convey the slice 60, and the final burst 61 has not yet occurred). When the input pointer detects that an input transfer is complete, it sets the slice input flag 84, which is used to signal output pointer 88 that a slice has been inputted into a particular channel 52 and 54. Output pointer 88 resets slice input flag 84 after the associated slice 60 has begun to be outputted. Output pointer 88 signals the rest of central control 34, to transfer the appropriate slice 60 out of the appropriate channel 52 and 54, and sets the transfer in progress flag 85 to signal that an output transfer has been ordered, through the output transfer may not yet have begun, or may not be complete. To signal that an output transfer is complete, output pointer 88 sets the slice output flag 87. The CCB fetch flag 1 is set by central control 34 when an output transfer is complete (transfer count is decremented to zero), and the CCB chaining bit 76-4 is set (indicating a CCB 70 is chained). CCB pointer 89 detects a set CCB chaining bit 1, and in response orders central control 34 to fetch the chained CCB 70.

The relationship between CCBs 70, CCB registers 72 and CS registers 74 is better understood with reference to a "snapshot" of CCB registers 72, CS registers 74 and DMA devices 44 and 46, a description of the embodiment that uses channel numbers 82 instead of dedicated slots 80. Referring now to FIGS. 2 and 3b, and Tables 1 and 2 below, there are described the conditions of CCB registers 72, CS registers 74 and devices 44 and 46 for a particular instance in time. For clarity, device 44 and its related registers 72 and 74-1 will be described first, followed by a description of device 46 and its related registers 72 and 74-2.

In FIG. 2 three channels 52 are shown residing in DMA device 44. The first of the three channels 52 to be outputted from device 44 will be channel 52-0. Channel 52-0 contains slice 60-2, which is composed of three double words 62. Following channel 52-0 is channel 52-3, which contains a slice 60-1 having five double words 62. Following channel 52-3 is channel 52-7, which contains slice 60-0 having two double words 62. Channel 52-7 was the most recent of the three channels 52 currently resident in device 44 to be inputted to device 44, and will be the last of the three channels 52 currently resident in device 44 to be outputted from device 44.

Referring now to FIG. 2 and table 2, the positions of channels 52-7, 52-7 and 52-0 in device 44 are established in CS register 74-1 by the relative positions of control words 81 in slots 80, and the positions of input pointer 86 and output pointer 88. For establishing the relative positions of resident channels 52, the only slots 80 in CS register 74-1 of interest are the slots 80 that lie in the path of output pointer 88-1, between the current position of the output pointer 88-1 and the current position of the input pointer 86-1: These are the slots 80 that can contain control words 81 designating channels 52 that input pointer 86-1 has caused to be added to device 44, but that have not yet been operated on (e.g., outputted) by output pointer 88-1.

Of course, in operation the contents of slots 80 and the positions of pointers 86-1 and 88-1 are not static. Output pointer 88-1 will circle the slots 80 of CS register 74-1 and cause resident channels 52 to be outputted from device 44. Meanwhile input pointer will circle the slots 80 and cause pending channels 52 to become resident in device 44. For the present analysis, however, input pointer 86-1 is held stationary while output pointer 88-1 advances, an approach that shows how CS register 74-1 establishes the relative positions of resident channels 52 in device 44.

TABLE 1

| CCB REG | CHANNEL | CCB 70 | CHANNEL STATUS | SLICE |
| --- | --- | --- | --- | --- |
| 72-0 | 52-0 | 70-0 | RESIDENT | 60-2 |
| 72-1 | 52-1 | NONE | N/A | N/A |
| 72-2 | 52-2 | NONE | N/A | N/A |
| 72-3 | 52-3 | 70-1 | RESIDENT | 60-1 |
| 72-4 | 52-4 | NONE | N/A | N/A |
| 72-5 | 52-5 | 70-2 | PENDING | N/A |
| 72-6 | 52-6 | NONE | N/A | N/A |
| 72-7 | 52-7 | 70-3 | RESIDENT | 60-0 |
| 72-8 | 54-0 | NONE | N/A | N/A |
| 72-9 | 54-1 | 70-4 | RESIDENT | 60-4 |
| 72-10 | 54-2 | NONE | N/A | N/A |
| 72-11 | 54-3 | 70-5 | RESIDENT | 60-5 |
| 72-12 | 54-4 | NONE | N/A | N/A |
| 72-13 | 54-5 | 70-6 | RESIDENT | 60-3 |
| 72-14 | 54-6 | 70-7 | RESIDENT | 60-6 |
| 72-15 | 54-7 | NONE | N/A | N/A |

At the moment output pointer 88-1 points to slot 80-5, and input pointer points to slot 80-2. Slot 80-5 contains control word 81-1, which includes a channel number 82 that identifies the channel 52 associated with control word 81-1. For CS register 74-1, each channel number 82 is a three bit binary designation of a particular channel 52. Control word 81-1 has a channel number 82 of binary 000, designating channel 52-0.

After operating on slot 80-5, pointer 88-1 will advance to slot 80-6. Slot 80-6 is empty of a control word 81. Next output pointer 88-1 will advance to slot 80-7, which contains control word 81-2. The channel number 82 of control word 81-2 is binary 011, which designates channel 52-3. After operating on slot 80-7, pointer 88-1 will circle back to slot 80-0. Slot 80-0 contains control word 81-0 having a channel number 82 of binary 111 that designates channel 52-7. Finally output pointer 88-1 will advance to slot 80-1, which is empty, completing operations on the slots 80 that lay in the path of output pointer 88-1. In this manner CS register 74-1 tracks channel 52-0 as the next channel 52 out of DMA device 44, followed by channel 52-3 then 52-7, an arrangement that agrees with the actual situation in device 44.

TABLE 2

| SLOT | CONTROL WORD | CHANNEL ID 82 | CHANNEL |
| --- | --- | --- | --- |
| 80-0 | 81-0 | 111 | 52-7 |
| 80-1 | NONE | N/A | N/A |
| 80-2 | NONE | N/A | N/A |
| 80-3 | NONE | N/A | N/A |
| 80-4 | NONE | N/A | N/A |
| 80-5 | 81-1 | 000 | 52-0 |
| 80-6 | NONE | N/A | N/A |
| 80-7 | 81-2 | 011 | 52-3 |
| 80-8 | NONE | N/A | N/A |
| 80-9 | NONE | N/A | N/A |
| 80-10 | 81-3 | 110 | 54-6 |
| 80-11 | 81-4 | 011 | 54-3 |
| 80-12 | 81-5 | 001 | 54-1 |
| 80-13 | 81-6 | 101 | 54-5 |
| 80-14 | NONE | N/A | N/A |
| 80-15 | NONE | N/A | N/A |

Referring now to FIGS. 2, 3B and table 1, as part of operating on a slot 80 containing a control word 81, output pointer 88-1 checks the channel number 82 of the control word 81 to find the channel register 72 associated with the channel number 82. In turn, the particular channel register 72 contains a CCB 70 that specifies additional information, such as source and destination addresses 17, needed to actually output a resident channel 52. The association between channels 52 and registers 72 is listed in table 1 and shown in FIG. 3B. There is a one-to-one correspondence between CCB registers 72 and possible channels 52 and 54. In particular, registers 72 associate CCBs 70-0, 70-1 and 70-3 with respective channels 52-0, 52-3 and 52-7. CCBs 70-0, 70-1 and 70-3 describe respective slices 60-2, 60-1 and 60-0. Note that although channel 52-5 is not resident in device 44, register 72-5 contains CCB 70-2: Channel 52-5 is pending residency in device 44.

Referring now to FIG. 2 and table 2, CS register 74-2 performs for DMA device 46 the same functions that CS register 74-1 performs for DMA device 44. Device 46 contains four channels 54. Channel 54-6 contains slice 60-6, and is the next channel 54 due to be outputted from device 46. Channel 54-6 will be followed in turn by channels 54-3, 54-1 and 54-5, which contain respective slices 60-5, 60-4 and 60-3. In CS register 74-2, input pointer 86-2 points to slot 80-14 and output pointer 88-2 points to slot 80-9. In the path of output pointer 88-2 between the current positions of output pointer 88-2 and input pointer 86-2 there are five slots 80, four of which contain control words 81. In particular, the following slots 80, in order, lie in the path of output pointer 88-2: slot 80-9 is empty, slot 80-10 contains control word 81-3 having a channel number 82 for channel 54-6 (i.e., binary 110), slot 80-11 contains control word 81-4 having a channel number 82 for channel 54-3 (i.e., binary 011), slot 80-12 contains control word 81-5 having channel number 82 for channel 54-1 (i.e., binary 001), and slot 80-13 contains control word 81-6 having channel number 82 for channel 54-5 (i.e., binary 101). In this manner CS register 74-2 tracks channel 54-6 as the next channel 54 out of DMA device 46, followed by channel 54-3, then 54-1, then 54-5, an arrangement that agrees with the actual situation in device 46.

Referring now to FIGS. 2, 3B and Table 1, there is shown the association between the channel 54 identified by channel IDs 82 of control words 81-6, 81-5, 81-4 and 81-3, and the CCB 70 associated with each identified channel 54. Note that at present there are no channels 54 pending for device 46.

Figure 5:
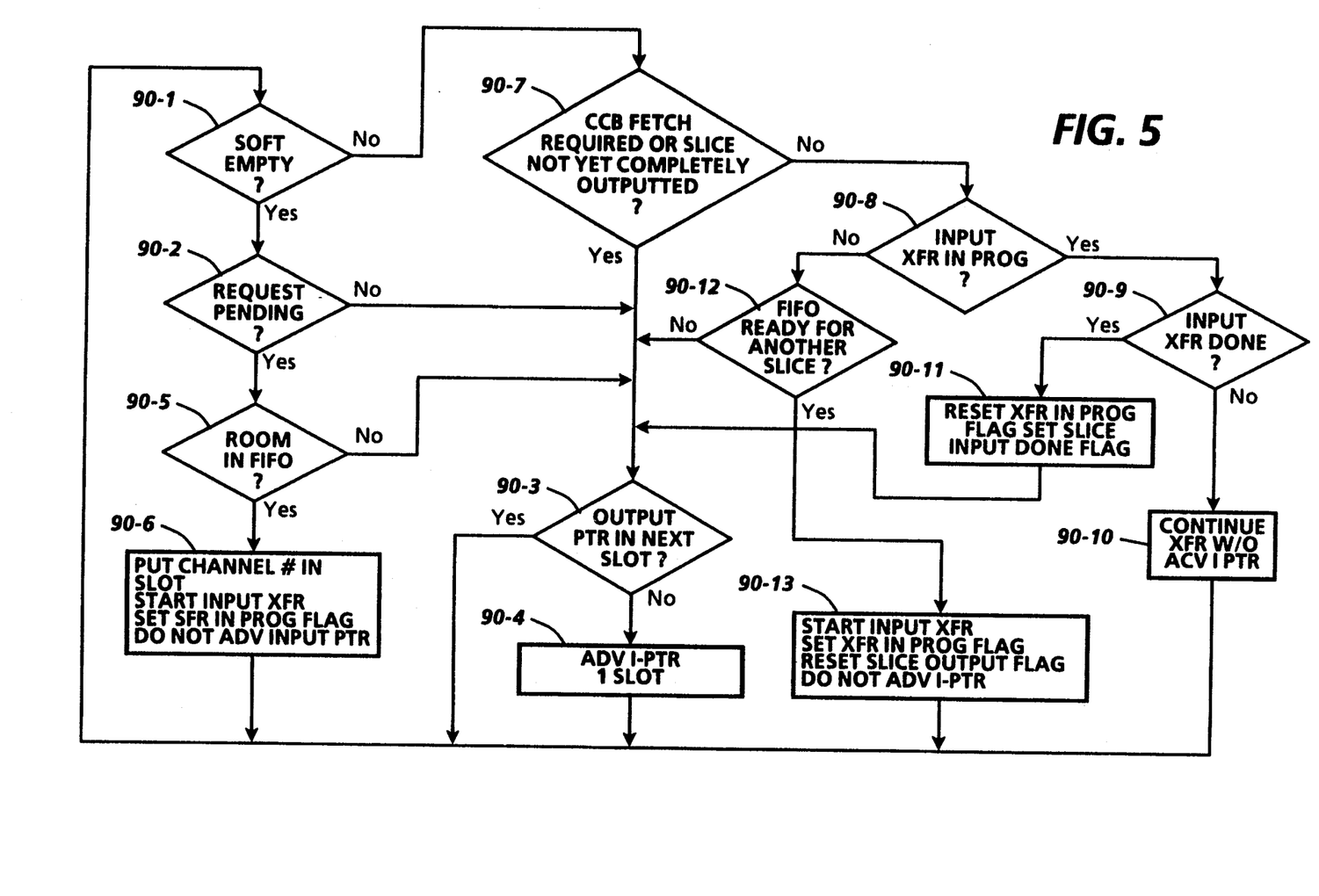
FIG. 5 is a flowchart depicting the operation of the input pointer of a CS register of FIG. 2.
Figure 6:
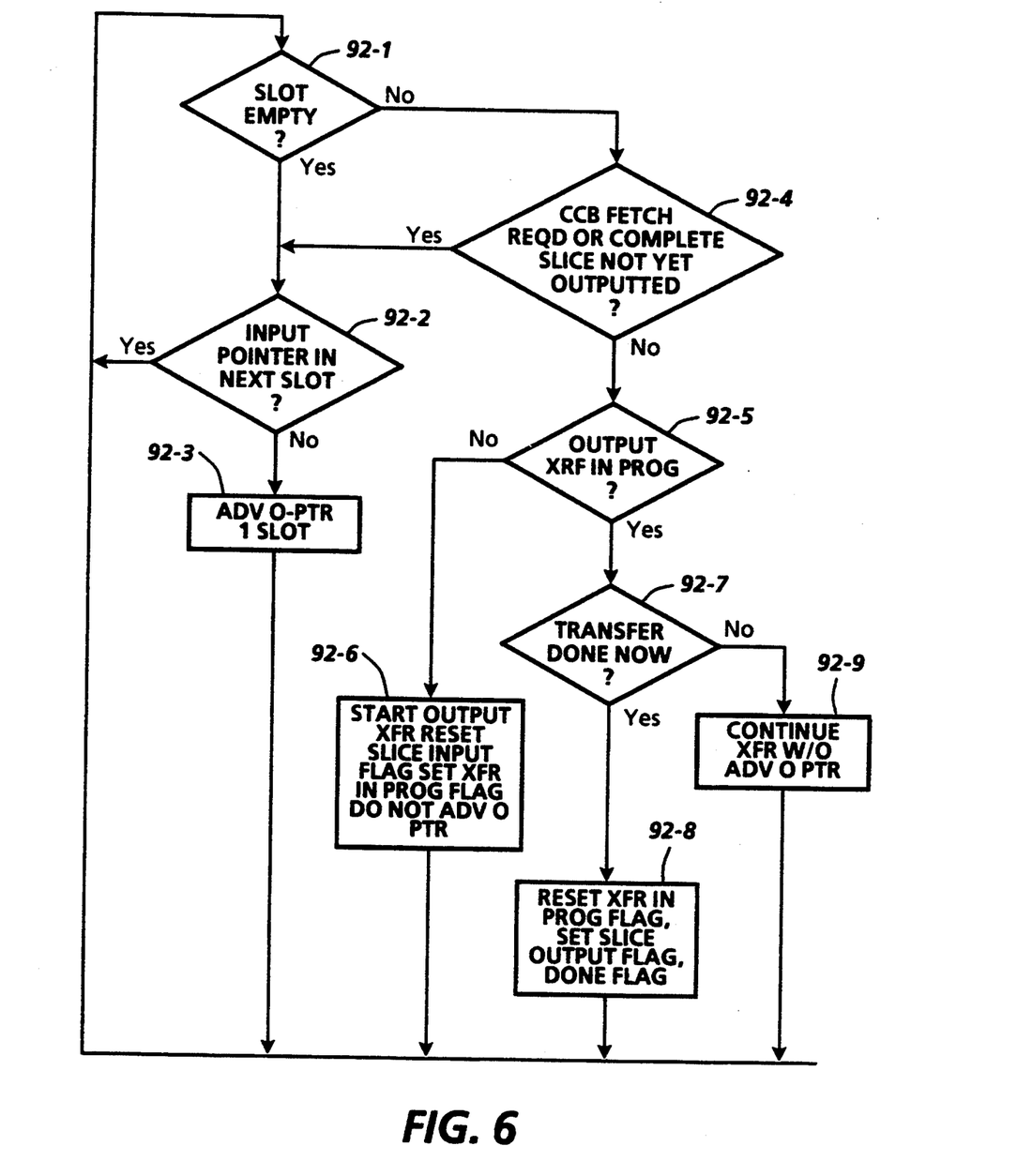
FIG. 6 is a flowchart depicting the operation of the output pointer of a CS register of FIG. 2.

Referring now to FIGS. 5 and 6, there are shown respective flowcharts 90 and 92 that diagram the actions of respective input and output pointers 86 and 88, under control of their respective state machines. There are separate charts 90 and 92 for the operation of input pointer 86 and output pointer 88, respectively, because input pointer 86 and output pointer 88 independently circle around CS register 74. However, pointers 86 and 88 interact by means of flags 84, 85, and 87. Moreover, the state machines do not allow input pointer 86 to pass by output pointer 88 to avoid overwriting a slice 60 in a resident channel 52 and 54 before that slice 60 has been outputted from the respective DMA device 44 and 46.

Referring first to FIGS. 1 and 5, in step 90-1 the input state machine associated with input pointer 86 determines whether the slot 80 to which input pointer 86 currently points is inactive. If slot 80 is inactive, then in step 90-2 the input state machine checks CCB register 72 for any pending requests for input of slices 60 of data to channels 52 and 54 of respective DMA device 44 and 46 associated with the particular CS register 74. A pending channel 52 and 54 is represented by CCBs 70 in CCB register 72 that have not already been assigned slots 80 in the CS register 74. If there is more than one channel 52 and 54 pending, central control 34 chooses between the pending input requests according to some arbitration scheme, as would be well known to one skilled in the art.

If in step 90-2 no channels 52 and 54 are pending, then in step 90-3 the input state machine checks the next slot 80 for the presence of the output pointer 88. If output pointer 88 is not present in the next slot 80, then in step 90-4 input pointer 86 is advanced to the next slot 80, and the procedure continues with a return to step 90-1. If output pointer 88 is present in the next slot 80, then the input state machine proceeds to step 90-1 without first advancing input pointer 86, a measure that prevents input flag 86 from passing output flag 88.

If in step 90-2 there is a pending channel 52 and 54, then in step 90-5 central control 34 determines for the chosen pending channel 52 and 54 whether there is room for the request in the particular DMA device 44 and 46. If there is insufficient room, the next step is step 90-3. Otherwise in step 90-6 the input state machine places the appropriate channel number 82 in the control word 81 in the slot 80. The appropriate channel number 82 is the channel number 82 associated with the particular CCB register 72 in which resides the particular CCB 70 of the chosen pending channel 52 and 54. The input state machine then signals to the rest of central control 34 to start the input process, and sets transfer in progress flag 85 to signal to the rest of central control 34 that a transfer in progress, and proceeds to step 90-1 without advancing the input pointer 86.

In step 90-1, if the slot 80 is active, then in step 90-7 the input state machine determines whether a slice 60 is still present in the associated channel 52 and 54 by checking the slice out flag 87 (which will be set if the associated slice 60 has been outputted), and also determines whether a CCB fetch is required by checking CCB fetch flag 1 (which will be set if a CCB fetch is required). If the slice 60 is present (i.e., the slice 60 has not yet been read out or transferred out) or a CCB fetch is required, then the input state machine proceeds to step 90-3. Otherwise in step 90-8 the input state machine determines whether an input transfer is in progress by checking the transfer in progress flag 85. If an input transfer is in progress, then in step 90-9 the input state machine determines whether the input transfer is now complete, again by checking the transfer in progress flag 85. For an incomplete input transfer, in step 90-10 central control 34 continues the input transfer, and input state machine proceeds to step 90-1 without advancing the input pointer 86. For a completed input transfer, in step 90-11 the input state machine resets transfer in progress flag 85 and sets slice input flag 84 to reflect that an input transfer is no longer in progress. These steps clear the way for output pointer 88 to order an output transfer of the particular slice 60. The input state machine then proceeds to step 90-3.

If in step 90-8 the input state machine determines that no input transfer is in progress, then in step 90-12 the input state machine determines whether the particular DMA device 44 and 46 is ready for another input transfer. If the device 44 and 46 is ready, then in step 90-13 the input state machine signals the rest of central control 34 to start the input transfer, sets transfer in progress flag, resets slice output flag 87, and returns to step 90-1 with out advancing input pointer 86. Otherwise, after step 90-12 the input state machine proceeds to step 90-3.

Referring now to FIGS. 1 and 6, in FIG. 4b flowchart 92 show the actions of output pointer 88. In step 92-1 output state machine determines whether the slot 80 to which output pointer 88 currently points is inactive. If the slot 80 is inactive, then in step 92-2 the output state machine determines whether the next slot 80 contains input pointer 86. If so, the output state machine returns to step 92-1 without advancing output pointer 88 to the next slot 80. Otherwise in step 92-3 the output state machine first advances output pointer 88 to the next slot 80, then proceeds to step 92-1.

In step 92-1 if slot 80 is active, then in step 92-4 the output state machine whether the slice 60 has been read out of DMA device 52 and 54, and determines whether a CCB fetch is required (i.e., CCB fetch flag 1 is set). If so, the output state machine proceeds to step 92-2. If not, then in step 92-5 the output state machine determines whether the slice 60 is currently being read out (e.g., transfer in progress flag 85 is set). If an output transfer is not currently in progress, then in step 92-6 output state machine signals central control 34 to begin the appropriate output transfer, sets slice output flag 87, then returns to step 92-1 without first advancing output pointer 88.

If in step 92-5 an output transfer is in progress, then in step 92-7 the output state machine determines whether the output transfer is now complete by checking the transfer counter. If so, in step 92-8 the transfer in progress flag 85 is reset, and the slice output flag 87 is set. Then the output state machine proceeds to step 92-1. If in step 92-7 the output transfer is not completed, the output state machine proceeds to step 92-9. In step 92-9 the output transfer is continued, and the output state machine advances to step 92-1 without advancing output pointer 88.

The CCB fetch pointer 89 functions independently of pointer 86 and 88, but in conjunction with the rest of central control 34. In circling registers 74, when a CCB fetch pointer encounters a set CCB fetch flag 1 in the control word 81 in a slot 80, the pointer initiates a CCB 70 fetch, an operation which uses the corresponding DMA device 46 and 48 to retrieve from a predetermined address a CCB 70 to replace the present CCB 70 in the CCB register 72 assigned to the corresponding channel 52 and 54. The CCB flags are set by central control 34: After completing an output transfer (transfer count decrements to zero), central control 34 checks the present CCB 70 for a set CCB chaining bit. In response to a set CCB chaining bit, central control sets the CCB flag in the control word 81.

In another preferred embodiment, CCB chaining is not allowed, a modification that only slightly changes the operation of input pointer 86 and output pointer 88. In particular, without CCB chaining, in steps 90-7 and 92-4, central control 34 need not determine whether a CCB fetch is required. Otherwise the operation of pointers 86 and 88 is the same as described in respective flowcharts 90 and 92.

UNIVERSAL CHANNEL SEQUENCE REGISTER

Figure 7:
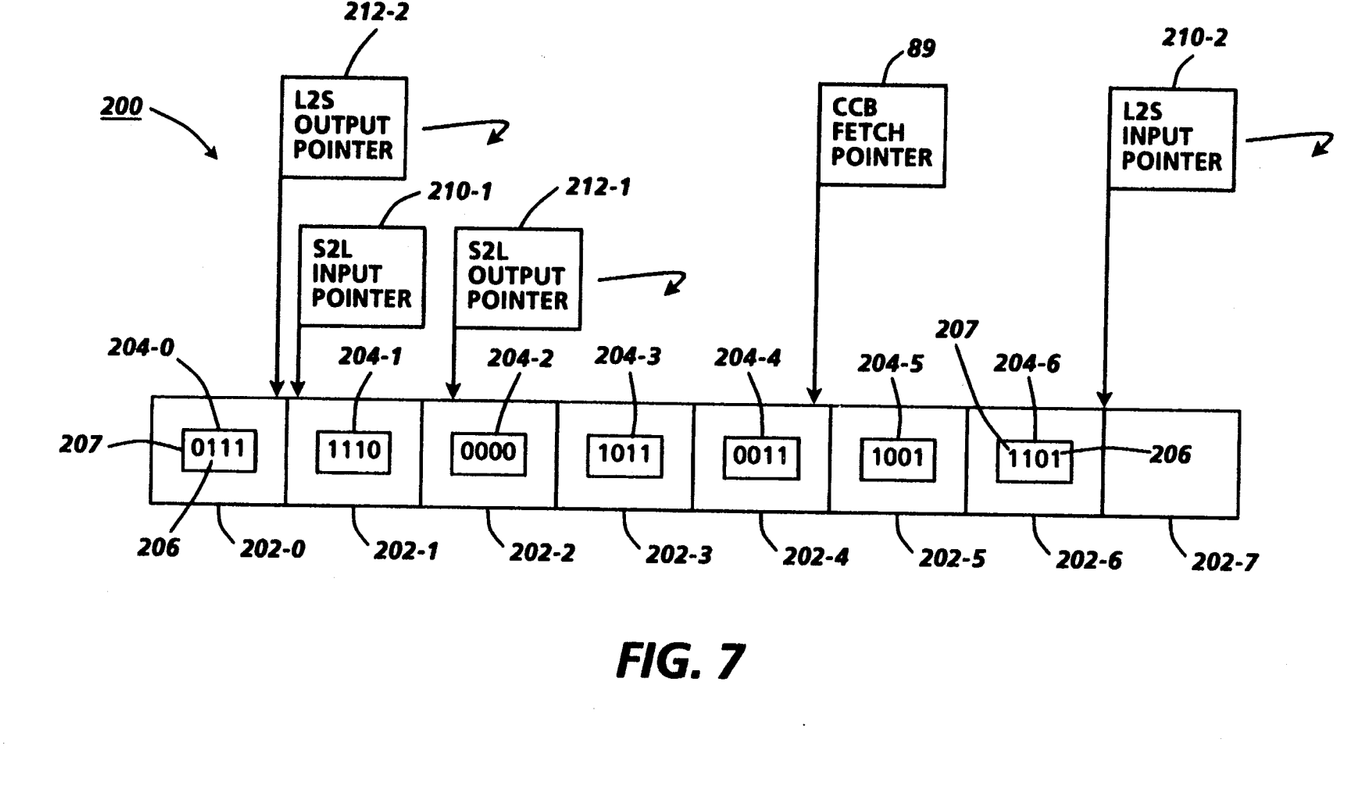
FIG. 7 is a diagram of an alternate embodiment of a CS register.

Referring now to FIGS. 1, 2 and 7, in FIG. 7 there is shown an alternative to using twin CS registers 74 to track and control channels 52 and 54 within respective DMA devices 44 and 46. The alternative is a single, universal, channel structure (UCS) register 200. USC register 200 contains eight slots 202 that function analogously to slots 80 of CS registers 74. Each slot 202 can contain a control word 204, analogous to a control word 81. Each control word 204 includes a channel number 206. Like channel number 82, each channel number 206 includes a three bit binary code to identify one of eight channels. In addition, each channel number 206 includes a fourth bit 207, the highest order bit of each channel number 206, that identifies the DMA device 44 and 46 to which the control word 81 relates; a zero designates device 44, and a one designates device 46. For example, slot 202-0 contains control word 204-2 having channel number 206 of binary 0111, which designates channel 52-7. This fourth bit 207 is a feature not needed with control words 81, since CS registers 74 are each dedicated to a particular DMA device 44 and 46.

UCS register 200 includes two input pointers 210 and two output pointers 212. In particular, S2L input pointer 210-1 and S2L output pointer 212-1 perform respective input and output operations for DMA device 44, while L2S input pointer 210-2 and L2S output pointer 212-2 perform respective input and output operations for DMA device 46. Input pointers 210 and output pointers 212 function analogously to respective input and output pointers 86 and 88 of CS registers 74. Both input pointers 210 operate on slots 202 substantially in accordance with flowchart 90 in FIG. 5 and the accompanying text, which describe the operations of input pointers 86. Similarly, both output pointers 212 circle the slots 202 of UCS register 200 operate on slots 202 substantially in accordance with flowchart 92 in FIG. 6 and the accompanying text, which describe the operation of output pointers 88.

One minor difference between how pointers 86 and 88 operate and how pointers 210 and 212 operate involves the concept of an empty or inactive slot 80 and 202. In FIGS. 5 and 6, in respective steps 90-1 and 92-1 central control 34 determines whether the slot 80 to which respective input and output pointers 86 and 88 currently point is inactive (i.e., empty of a valid control word 81). For pointers 210 and 212, the definition of an inactive or empty slot 202 must take into account that a valid control word 204 can be present in a slot 202, and yet not pertain to the pointer 210 and 212 pointing at that slot 202. For example, in FIG. 7 both L2S output pointer 212-2 and S2L input pointer 210-1 point to slot 202-1. Slot 202-1 contains control word 204-1, which has a channel number 206 that identifies channel 54-6 (i.e., binary 1110). Obviously channel 54-6, a channel 54 resident in device 46, is relevant to output pointer 212-2 and not relevant to input pointer 210-1. Which device 44 and 46 a control word 204 pertains to is readily determined by checking the fourth bit 207 of the channel number 206 of the control word 204, as discussed above.

FIG. 7 shows a UCS register 200 that is set up to duplicate the snapshot of devices 44 and 46 provided by CS registers 74 in FIG. 2. Referring first to the channels 52 resident in device 44, for UCS register 200 S2L output pointer 212-1 points to slot 202-2, S2L input pointer 210-1 points to slot 202-1, and between the current positions of output pointer 212-1 and input pointer 210-1 there are three slots 202 containing control words 204 in the path of output pointer 212-1 that pertain to device 44. In particular, the slot 202 that output pointer 212-1 points to, slot 202-2, contains control word 204-2 having a channel number 206 that identifies channel 52-0.

The next slot 202 encountered by output pointer 212-2 as it advances will be slot 202-3 containing a control word 204-3 having a channel number 206 that identifies a channel 54-3 of device 46, a control word 204 that is not relevant to output pointer 212-1. Thereafter output pointer 212-1 will encounter slot 204-4, which contains a relevant control word 204, control word 204-4 having channel number 206 identifying channel 52-3. The next two slots 202 in order, slots 202-5 and 202-6, contain control words 204 pertaining to channels 54 of device 46, followed by slot 202-7, which is empty of control words 204. The next relevant slot is slot 202-0. Slot 202-0 contains control word 204-0 having channel number 206 that identifies channel 52-7 (i.e., binary 0111). In this manner UCS register 200 tracks channel 52-0 as the next channel 52 out of DMA device 44, followed by channel 52-3 then 52-7, an arrangement that agrees with the actual situation in device 44.

Referring now to the channels 54 resident in device 46, L2S output pointer 212-2 points to slot 202-1, L2S input pointer 212-2 points to slot 202-7, and between the current positions of output pointer 212-2 and input pointer 210-2 there are four slots 202 containing control words 204 in the path of output pointer 212-2 that pertain to device 46.

In particular, slot 202-1 contains control word 204-1 having a channel number 206 that identifies channel 54-6. The next slot 202 encountered by output pointer 212-2 as it advances will be slot 202-2. Slot 202-2 contains a control word 204-2 having a channel number 206 that identifies a channel 52-0 of device 44, a control word 204 that is not relevant to output pointer 212-2. Thereafter output pointer 212-1 will encounter slot 204-3, which contains a relevant control word 204, control word 204-3 having channel number 206 identifying channel 54-3. Next, slot 202-4 contains a control word 204-4 which is not relevant to device 46. The next two slots 202 are slot 202-5 and slot 202-6, which contain respective control words 204-5 and 204-6 identifying respective channels 54-1 and 54-5. In this manner UCS register 200 tracks channel 54-6 as the next channel 54 out of DMA device 46, followed by channel 54-3, 54-1 and then 54-5, an arrangement that agrees with the actual situation in device 46.

One advantage of UCS register 200 over twin CS registers 74 is the savings of space on an integrated circuit die. Another advantage is simplified design and testing and diagnostics.

PIO DEVICES AVOID DEADLOCK OF DMA DEVICES

An unfortunate condition of S-bus 12 design involves the inability of the S-Bus to perform multiple bus cycles in one request, and the requirement that the S-Bus arbitor always grant the S-Bus to a previously rerun S-Bus master. These two conditions prevent concurrent requests to perform DMA and PIO transfers (i.e., transfers involving DMA device 46 and PIO device 48) that involve the S-Bus. That is if bus to bus interface 10 is trying to perform a DMA transfer to an S-bus device 16, while an S-Bus host (i.e., S-Bus master) is trying to perform a PIO transfer to or through interface 10, then the logic within interface 10 trying to perform the DMA transfer is granted the A-bus 36, but not the S-bus, while the S-bus master is granted the S-bus, but not the A-bus 36. The net result is neither transfer can occur—a deadlock.

To avoid the above problem of deadlock, the solution is to be able to suspend the DMA transfer while maintaining the integrity of the DMA data, complete the PIO transfer, then resume the DMA transfer. To implement this solution, S-bus interface 30 includes A-bus staging registers 164-1 and 162-1 to store any requisite DMA data while DMA transfers are suspended, thereby maintaining DMA data integrity, and PIO bypass registers 164-2 and 162-2, used exclusively for PIO transfers, to allow PIO data to bypass A-bus registers 164-1 and 162-2. Moreover, to complete the PIO transfer, separate PIO buffers 48 and 50 are provided. In most cases the separate PIO buffers 48 and 50 allow faster completion of PIO transfers than possible if a route through DMA device 46 was chosen. Moreover, in some cases the DMA device 46 would be locked out: A proceeding channel 52 requiring access to A-bus 36 (i.e., an S-bus 12 to S-bus 12 transfer through DMA device 46) would block access to DMA device 46, since that DMA transfer would be granted A-bus 36.

IMPLEMENTING FIFO DEVICES AND CCB REGISTERS IN RAM

Referring now to FIGS. 1, 2 and 3, preferably FIFO devices 44, 46, 48, and 50 are each implemented with respective portions 98-1, 98-2, 98-3 and 98-4 of RAM 100. Similarly, CCB registers 72 are implemented in a portion 71 of RAM 100. Within each RAM portion 98 and 100 data is stored as double words 62. As previously mentioned, each double word 62 consists of two words 64. Each word 64 consists of thirty two bits, organized as four bytes 66.

Each RAM portion 98 operates circularly, using a read pointer 102 and a write pointer 104 to keep track of the memory locations 64 from which data should be written and read, respectively. In particular, read pointer 102 points to the memory location 64-1 of the next write operation, the location 106 which will receive the next double word 62 of data inputted to the RAM portion 98. Write pointer 104 points to the memory location 108 of the next read operation, the location 108 from which the next double word 62 of data will be outputted from RAM portion 98. In operation, write pointer 104 is not allowed to pass read pointer 102 to avoid inputted data from overwriting existing data before the existing data has been outputted.

Preferably each RAM portion 98 for DMA devices 44 and 46 consists of 256 bytes 66, organized as 32 double words 62. Preferably each RAM portion 98 for PIO devices 48 and 50 consists of 128 bytes 66, organized as 16 double words 62. Of course it would be well know to one skilled in the art to either increase or decrease the sizes of RAM portions 98 for devices 44, 46, 48, and 50. The size of RAM portion 98 for devices 48 and 50 is based on the maximum burst size for devices 16 on S-bus 12. For devices 16, the S-bus 12 protocol restricts the amount of data transferred in any one burst (i.e., at any one time) to 128 bytes 66, an amount of data that can be accommodated by a 128 byte 66 RAM portion 98.

Preferably each RAM portion 98 is dual port to simplify the control of FIFO devices 46 and 48. In this manner the input port 110 of each FIFO device 44 and 46 is a write-read port to facilitate intrabus communication on buses 12 and 14. The output port 112 of devices 44 and 46 need only be a read port.

S-BUS INTERFACE AND L-BUS INTERFACE

Figure 8:
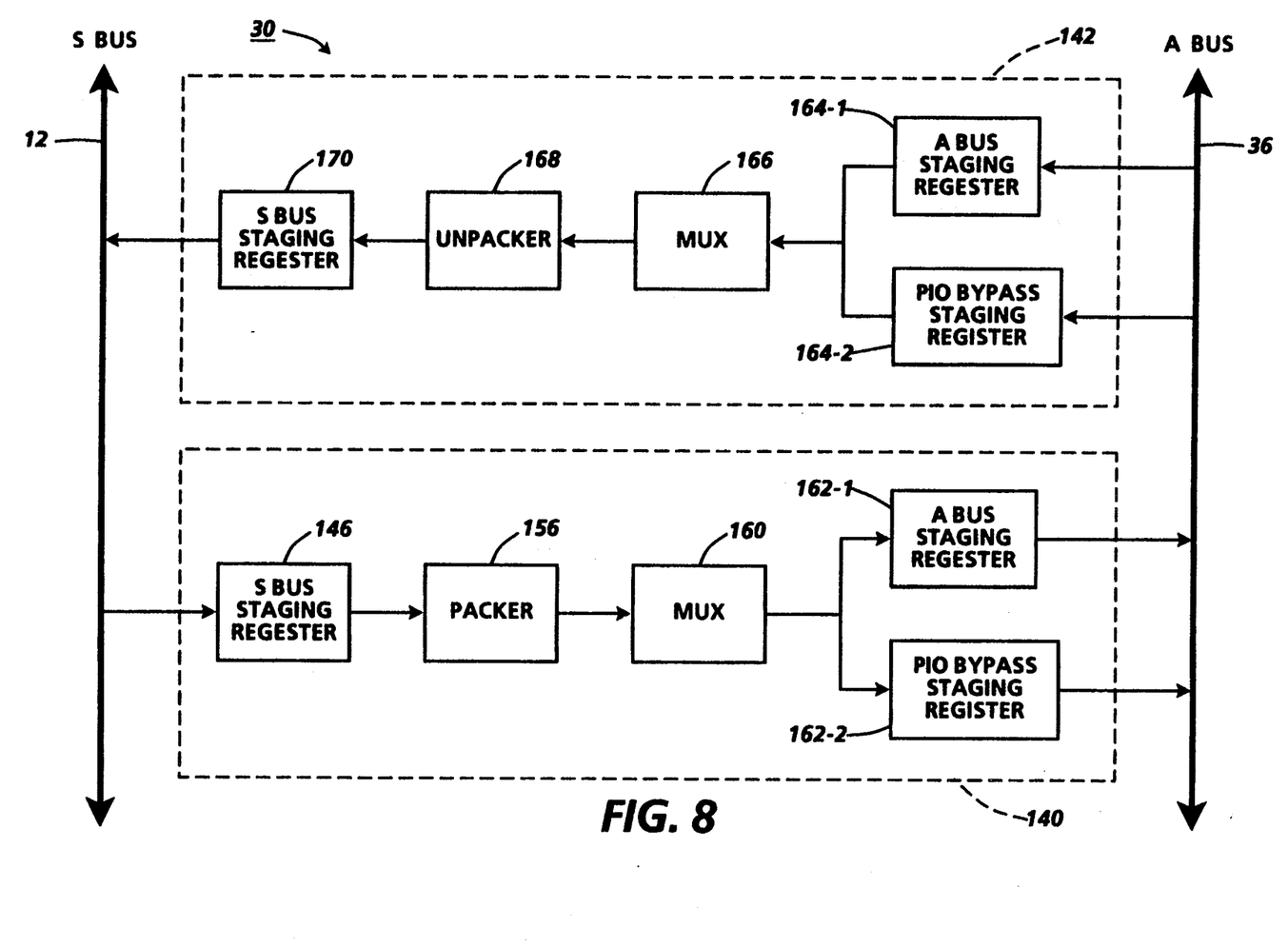
FIG. 8 is a system block diagram depicting the S-bus interface of FIG. 1.

Referring now to FIGS. 1, 4 and 8, in FIG. 8 there is shown a block diagram describing S-bus interface 30 in more detail. S-bus interface 30 consists of two main parts. Input section 140 handles data transfers from S-bus 12 to A-bus 36. Output section 142 handles data transfers from A-bus 36 to S-bus 12. The operation of input and output sections 140 and 142 are controlled by central controller 34.

Input section 140 includes an S-bus staging register 146 connected to S-bus 12 for receiving data from S-bus 12. Staging register 146 is synchronized with S-bus 12 for the orderly transfer of data. Preferably staging register 146 is 64 bits wide to accommodate up to the 64 bit word 154. Staging register 146 connects to packer 156. If necessary, packer 156 converts the data received from staging register 146 into the 64 bit data words used by central buffer 28. For example, packer 156 will pack a series of two 32 bit data words into a single 64 bit data word. Packer 156 will also perform any required reordering of bits (e.g., from least significant byte to most significant byte).

Packer 156 connects to multiplexer 160. Multiplexer 160 switches data words from packer 156 to one of two A-bus staging registers 162. Registers 162 are each 64 bits wide to accommodate the 64 bit data words. From registers 162 data words are sent to central buffer 28 via A-bus 36. Two registers 162 are provided so that the presently loaded register 162 can be bypassed by PIO transfers.

Similar to input section 140, output section 142 consists of two A-bus staging registers 164, connected to A-bus 36, that receive data words from A-bus 36. Each A-bus staging register 164 is 64 bits wide to accommodate the 64 bit wide data word. Two registers 164 are again provided so that the presently loaded register 162 can be bypassed by PIO transfers.

Multiplexer 166 connects staging registers 164 to unpacker 168. Multiplexer 166 connects only one of staging registers 164 to unpacker 168 at a time. If necessary, unpacker 168 converts or unpacks data word into data words of a size accepted by the device 16, such as hard drive 16-4, to which the data is addressed. Unpacker 168 connects to staging register 170, which is synchronized with S-bus 12 for the orderly transfer of data.

Figure 9:
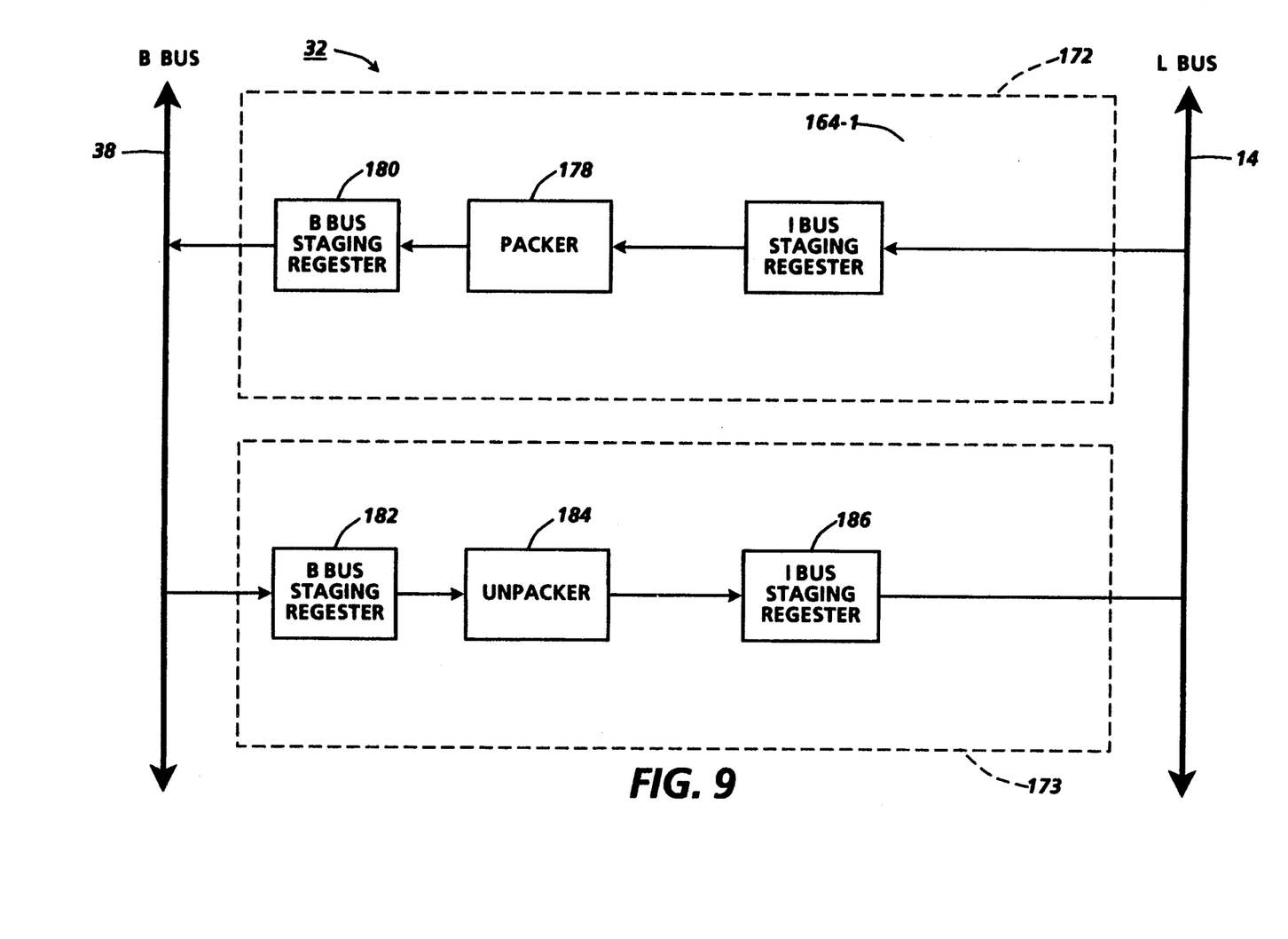
FIG. 9 is a system block diagram depicting the L-bus interface of FIG. 1.

Referring now to FIGS. 1, 4 and 9, in FIG. 9 there is shown a block diagram describing L-bus interface 32 in more detail. Like S-bus interface 30, L-bus interface 32 consists of two main parts that are controlled by central controller 34. Input section 172 handles data transfers from L-bus 14 to B-bus 38. Output section 173 handles data transfers from B-bus 38 to L-bus 14.

Input section 172 includes a staging register 174 connected to L-bus 14 for receiving data from L-bus 14. Staging register 174 is synchronized with L-bus 14 for the orderly transfer of data. Staging register 174 receives from L-bus 14 a 32 bit wide data word from 32 parallel data lines (not shown). Staging register 174 connects to packer 178. Packer 178 converts or packs two of the 32 bit data word received from staging register 174 into one of the 64 bit data words used by central buffer 28. Packer 178 will also perform any required reordering of bits (e.g., from least significant byte to most significant byte).

Packer 178 connects to B-bus staging register 180. Register 180 is 64 bits wide to accommodate the 64 bit data words. From register 180 data words are sent to central buffer 28 via B-bus 38. Unlike S-bus interface 30, here only a single staging register 180 is used, since L-bus 14 does not allow the conditions that prompt gridlock.

Similar to input section 172, output section 173 consists of a single B-bus staging register 182, connected to B-bus 38, that receives data words from B-bus 38. Each B-bus staging register 182 is 64 bits wide to accommodate the 64 bit wide data word. Staging register 182 connects to unpacker 184, which converts or unpacks data word into thirty two bit wide data words 176. Unpacker 184 will also perform any required reordering of bits (e.g., from least significant byte to most significant byte). Unpacker 184 connects to staging register 186, which is synchronized with L-bus 14 for the orderly transfer of data.

While the invention has been described with reference to the structures disclosed, it is not confined to the specific details set forth, but is intended to cover such modifications or changes as may come within the scope of the following claims.

We claim:

1. A bus to bus interface for connecting a first bus to a second bus, the bus to bus interface comprising:
   first bus interface means connected to the first bus for conveying data and control information to and from the first bus;
   second bus interface means connected to the second bus for conveying data and control information to and from the second bus;

central buffer means connected to the first bus interface means and the second bus interface means, the central buffer means including:

first FIFO device connected to first bus interface means and second bus interface means for conveying data, organized within first FIFO device as one or more serial, identified, channels, from first bus interface means to second bus interface means;

second FIFO device connected to first bus interface means and second bus interface means for conveying data, organized within second FIFO device as one or more serial, identified, channels, from second bus interface means to first bus interface means;

control means connected to the first bus, first bus interface means, second bus, second bus interface means, and the central buffer means, for receiving and transmitting control information from and to the first bus, first bus interface means, second bus, second bus interface means, and the central buffer means, and for controlling the operation of first bus interface means, second bus interface means, and the central buffer means, including operation of the first and second FIFO devices, in response to the received control information;

wherein central buffer means is for conveying data between first bus interface means and second bus interface means, and for conveying control information between control means and first bus interface means and second bus interface means; and wherein the control means includes:

first control sequence means for tracking and controlling the channels of data within first FIFO device, the first sequence control means comprising:

first circular queue means for providing a predetermined number of slots, with the slots arranged circularly in series, with each slot capable of containing information regarding a channel of data already resident in first FIFO device, including the identity of the channel and the status of the channel, and capable of containing information regarding a channel of data pending residence in first FIFO device, including the identity of the pending channel;

first input pointer means for traversing first circular queue means, slot by slot, and if a slot contains the identity of a resident channel, then updating the status information in the slot of that resident channel, and if the slot does not contain the identity of a resident channel, then determining whether any channels are pending residence in first FIFO device, and if so inserting in the slot the identity of a pending channel and commencing transfer of the pending channel into first FIFO device, provided first FIFO device has room for the pending channel;

first output pointer means for traversing circular queue means, slot by slot, and if a slot contains the identity of a first FIFO device resident channel, then commensing transfer of that channel from the first FIFO device;

wherein the first input pointer means is prevented from advancing to the same slot as the first output pointer means, and the first output pointer means is prevented from advancing to the same slot as the first input pointer means so that resident channels of data in first FIFO device are not overwritten before the resident channels of data are outputted from the first FIFO device;

second control sequence means for tracking and controlling the channels of data within second FIFO device, the second sequence control means comprising:

second circular queue means for providing a predetermined number of slots, with the slots arranged circularly in series, with each slot capable of containing information regarding a channel of data already resident in second FIFO device, including the identity of the channel and the status of the channel, and capable of containing information regarding a channel of data pending residence in second FIFO device, including the identity of the pending channel;

second input pointer means for traversing second circular queue means, slot by slot, and if a slot contains the identity of a resident channel, then updating the status information in the slot of that resident channel, and if the slot does not contain the identity of a resident channel, then determining whether any channels are pending residence in second FIFO device, and if so inserting in the slot the identity of a pending channel and commencing transfer of the pending channel into second FIFO device, provided second FIFO device has room for the pending channel;

second output pointer means for traversing circular queue means, slot by slot, and if a slot contains the identity of a second FIFO device resident channel, then commensing transfer of that channel from the first FIFO device; and wherein the second input pointer means is prevented from advancing to the same slot as the second output pointer means, and the second output pointer means is prevented from advancing to the same slot as the second input pointer means so that resident channels of data in second FIFO device are not overwritten before the resident channels of data are outputted from the second FIFO device.

* * * * *